Patented Apr. 21, 1953

2,636,027

UNITED STATES PATENT OFFICE 2,636,027

ALKYL ESTERS OF ALLYL PHOSPHONIC ACIDS AND POLYMERS PREPARED THEREFROM

Harry W. Coover and Joseph B. Dickey, Rochester, N. Y., assignors to Eastman Kodak Company, Rochester, N. Y., a corporation of New Jersey No Drawing. Application October 6, 1948, Serial No. 53,134

2 Claims. (Cl. 260—85.5)

This invention relates to new phosphorus-containing compounds. More particularly this invention relates to alkyl esters of allylphosphonic acids, polymers of these alkyl esters of allylphosphonic acids, and to methods for preparing these alkyl esters of allylphosphonic acids and their polymers.

Alkyl esters of propene-2-phosphonic acid have previously been described (Hamilton U. S. Patent 2,365,466, dated December 19, 1944), as have the polymers of such esters (Lindsey U. S. Patent 2,439,214, dated April 6, 1948). Esters of butadienylphosphonic acid and polymers of such esters have also been described (Kosolapoff U. S. Patent 2,389,576, dated November 20, 1945). We have now prepared a new class of phosphorus compounds comprising alkyl esters of allylphosphonic acids. We have further found that these new esters can be polymerized to give polymers useful in the preparation of fibers, films, sheets, coating objects, etc.

It is, therefore, an object of our invention to provide esters of allylphosphonic acids. A further object is to provide methods for preparing these new esters. Another object is to provide polymers of esters of allylphosphonic acids. Still another object is to provide methods for preparing these new polymers. Other objects will become apparent from a consideration of the following description and examples.

According to our invention, our new esters of allylphosphonic acids can be prepared by condensing an allyl halide with a trialkyl phosphite or an alkali metal salt of a dialkyl acid phosphite. The polymers of these esters are advantageously prepared by heating such compounds in the presence of one or more of the usual polymerization initiators, such as the peroxide polymerization catalysts or initiators.

As trialkyl phosphites we can advantageously use trimethyl phosphite, triethyl phosphite, tri-n-propyl phosphite, triisopropyl phosphite, tri-n-butyl phosphite, triisobutyl phosphite, etc. (e. g. trialkyl phosphites containing from 1 to 4 carbon atoms in each of the alkyl groups).

As alkali metal salts of dialkyl acid phosphites we can use the sodium, potassium, lithium, etc. salts of dimethyl acid phosphite, diethyl acid phosphite, di-n-propyl acid phosphite, diisopropyl acid phosphite, di-n-butyl acid phosphite, diisobutyl acid phosphite, etc. (e. g. salts of metals of group I of the periodic system of dialkyl acid phosphites containing from 1 to 4 carbon atoms in each of the alkyl groups). Alkali metal salts of mixed dialkyl acid phosphites (i. e. salts of dialkyl acid phosphites wherein the alkyl groups are different), e. g. ethyl methyl acid phosphite, etc. can also be advantageously utilized in our invention.

The allyl halides useful in practicing our invention can be represented by the following general formula:

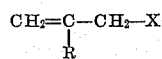

wherein R represents a hydrogen atom or an alkyl group, such as methyl, ethyl, etc. groups, and X represents a halogen atom (e. g. chlorine, bromine, etc.). Typical allyl halides include allyl chloride, allyl bromide, α-methylallyl chloride, α-methylallyl bromide, α-ethylallyl chloride, α-ethylallyl bromide, allyl iodide, etc.

The following examples will serve to illustrate more fully the manner whereby we practice our invention.

*Example 1.—Diethyl allylphosphonate*

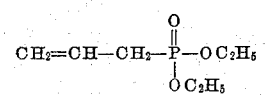

60.5 g. of allyl bromide and 83.0 g. of triethyl phosphite were placed in a Claisen flask, and the mixture was heated at such a rate that a gentle stream of ethyl bromide was evolved. When ethyl bromide was no longer evolved, the residue was fractionated in a fractionating column. A 90 per cent yield of diethyl allylphosphonate boiling at 58° to 60° C./<1 mm. was obtained.

When a molecularly equivalent amount of α-ethylallyl chloride replaces the allyl bromide in the above example, diethyl α-ethylallylphosphonate represented by the formula:

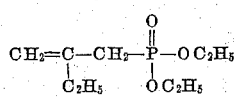

can be obtained.

*Example 2.—Di-n-butyl allylphosphonate*

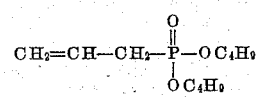

2.3 g. of metallic sodium were placed in a three-necked, round-bottom flask, equipped with a dropping funnel, sealed stirrer and reflux condenser closed with a calcium chloride tube. 100 cc. of dry toluene were then added, and while the toluene was gently refluxed, 19.4 g. of di-n-butyl acid phosphite were added dropwise. Refluxing and stirring were then continued until all of the sodium had dissolved.

The sodium di-n-butyl phosphite prepared above was cooled in an ice-salt bath, and 12.5 g. of allyl bromide were added dropwise, keeping the temperature below 10° C. after the addition was complete, the reaction mixture was heated under reflux for 3 hours and allowed to stand overnight. After washing the reaction mixture thoroughly with water, it was fractionated in a fractionating column. The desired product was obtained as a liquid boiling at 89° to 91° C./1 mm.

When a molecularly equivalent amount of α-methylallyl bromide replaces the allyl bromide in the above example, di-n-butyl α-methylallylphosphonate represented by the formula:

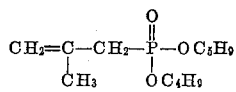

can be obtained.

*Example 3.—Diethyl α-methylallylphosphonate*

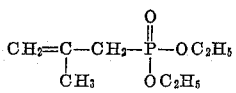

45.3 g. of α-methylallyl chloride and 83.0 g. of triethyl phosphite were placed in a Claisen flask, and 2.0 g. of potassium iodide were added to catalyse the reaction. The reaction mixture was then heated at such a rate that a gentle stream of ethyl chloride was evolved. When no more ethyl chloride was evolved, the residue was fractionated in a fractionating column. The desired product boiled at 108° to 117° C./17 mm.

*Example 4.—Ethyl methyl allylphosphonate*

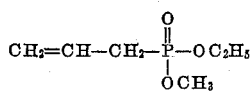

2.3 g. of metallic sodium were placed in a three-necked, round-bottom flask, which was equipped with a dropping funnel, sealed stirrer and a reflux condenser closed with a calcium chloride tube, and 100 cc. of dry benzene were added. While the mixture was gently warmed, 12.4 g. of ethyl methyl hydrogen phosphite were added dropwise. Heating and stirring were continued until all of the sodium had completely reacted.

After cooling the reaction mixture in an ice bath, 12.5 g. of allyl bromide were added dropwise, the temperature being kept below 10° C. by cooling when necessary. After all of the allyl bromide had been added, the reaction mixture was heating under gentle reflux for 2 hours. The reaction mixture was then thoroughly washed with water, and the upper, organic layer was fractionally distilled. Methyl ethyl allylphosphonate was obtained as a distillate boiling at 50° to 52° C./1 mm. of mercury.

The ethyl methyl hydrogen phosphite used in the above example was prepared as follows:

133 g. of methoxy dichlorophosphine were dissolved in 300 cc. of diethyl ether, and the solution was slowly added to 100 g. of anhydrous ethanol in a three-necked, round-bottom flask, which was equipped with a stirrer, an inlet tube for air and a condenser. During the addition the reaction mixture was cooled in an ice bath, and air was bubbled through to remove as much hydrogen chloride as possible. After 30 minutes, dry ammonia was passed into the reaction mixture and the ammonium chloride which separated removed. After filtering the reaction mixture, more dry ammonia was passed through to insure that all of the hydrogen chloride had been removed. On distillation 95 g. of ethyl methyl hydrogen phosphite boiling at 67° C./8 mm. of mercury were obtained.

Other mixed dialkyl hydrogen phosphites can be prepared in a manner similar to that illustrated above. For example, by replacing the anhydrous ethanol by a molecularly equivalent amount of anhydrous n-butanol, n-butyl methyl hydrogen phosphite can be obtained.

In a similar manner, other alkyl esters of allylphosphonic acids can be obtained by replacing the trialkyl phosphites, dialkyl hydrogen phosphite alkali metal salts, or allyl halides shown with other compounds selected from those set forth above. The alkyl esters of allylphosphonic acids of our invention can advantageously be represented by the following general formula:

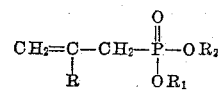

wherein R has the values set forth above, and $R_1$ and $R_2$ each represents an alkyl group, such as methyl, ethyl, n-propyl, isopropyl, n-butyl, isobutyl, etc. groups (e. g. an alkyl group of the formula $C_nH_{2n+1}$ wherein $n$ is a positive integer from 1 to 4). Other alkyl esters of allylphosphonic acids coming within the scope of our invention include, for example, those represented by the following formulas:

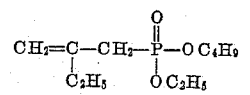

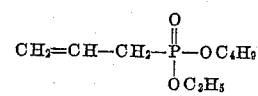

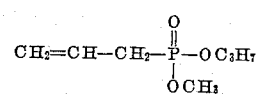

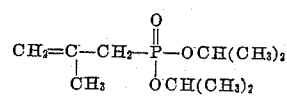

etc.

The alkyl esters of allylphosphonic acids of this invention can be either homopolymerized or interpolymerized with another copolymerizable unsaturated compound by any of the known methods employed in the art. The molecular weight of the polymers will depend somewhat on the method and conditions employed in the polymerization. Thus the molecular weight of the polymers can be low and correspond to a product of only 3 or 4 monomer units, or it can be higher and correspond to a product of 500, or more, monomer units. Polymers can be prepared, for example, by heating our new alkyl esters, in the presence or absence of another copolymerizable, unsaturated compound, in the presence of substances which are known to initiate the polymerization of vinyl-type compounds. Typical catalysts include gaseous oxygen (for the more difficultly polymerizable compounds), the organic peroxides, such as benzoyl peroxide, acetyl peroxide, acetyl benzoyl peroxide, lauroyl peroxide, oleoyl peroxide, etc., the persulfates, such as the alkali persulfates (e. g.

sodium, potassium, etc. persulfates) or ammonium persulfate, hydrogen peroxide, etc. Actinic or ultraviolet light can be used alone or to supplement the above catalysts or initiators. Certain so-called "accelerators" such as sodium bisulfite, etc., or "chain regulators," such as dodecyl mercaptan, diisopropyl dixanthogen, etc. can be used in conjunction with the usual polymerization catalysts or initiators, if desired.

The polymerization can also be carried out by the bead or emulsion method, in which water or some other medium in which the monomers are substantially insoluble, is used with or without the aid of dispersing agents, the polymer thus precipitating as it is formed. Our polymerization can also be carried out in the presence of an organic solvent for the monomers, but in which the polymers are substantially insoluble. Solvents can be used, however, which dissolve the polymer where this is desired, the polymer being obtained by pouring the polymerization solution into a solvent such as methanol, ethanol, acetic acid, etc., in which the polymer is not soluble.

The quantity of polymerization catalyst used can be varied and is generally a functon of the unsaturated compounds being polymerized. Generally from 0.01 per cent to 2.0 per cent by weight, based on the total weight of polymerizable compounds present, is adequate. Larger amounts can be used, if desired, although there is ordinarily no advantage in doing so. Usually increasing the quantity of polymerization catalyst or initiator causes a lowering of the molecular weight of the resulting polymer.

The polymerization can be carried out at or near room temperature, or at temperatures above the normal boiling points of the compounds being polymerized. In the polymerization of normally gaseous olefinic compounds with our new alkyl esters of allyl-phosphonic acids, the normally gaseous olefinic compound can be introduced in gaseous or liquid form into the cooled reaction vessel containing our new alkyl esters of allylphosphonic acids (which are advantageously dispersed in an aqueous medium containing a dispersing agent and a polymerization initiator), and the reaction vessel then sealed and removed from the cooling medium. The polymerization can then be allowed to proceed at room temperature or can be subjected to elevated temperatures.

The polymerizations can be carried out at atmospheric pressure, or at pressures above atmospheric pressure.

The following examples will serve to illustrate the manner whereby polymers can be obtained from our dialkyl esters of allylphosphonic acids.

*Example 5.—Copolymer of acrylonitrile and diethyl allylphosphonate*

5 g. of acrylonitrile, 5 g. of diethyl allylphosphonate, 1 cc. of 10 per cent aqueous solution of hydrogen peroxide, 1 cc. of 6N sulfuric acid and 0.15 g. of $FeSO_4 \cdot 7H_2O$ were added to 50 cc. of distilled water. The mixture was heated for 12 hours at 60° C., and the product, which had precipitated was filtered off, washed free of acid and iron with distilled water and then dried. There was thus obtained a white, powdery polymer which could be shaped into molded objects.

When a molecularly equivalent amount of α-methylacrylonitrile replaces the acrylonitrile in the above example, a polymer useful in the preparation of molded objects, etc. can be obtained.

*Example 6.—Copolymer of acrylonitrile and di-n-butyl allylphosphonate*

5 g. of acrylonitrile, 1.0 g. of di-n-butyl allylphosphonate, 1 cc. of a 10 per cent aqueous solution of hydrogen peroxide, 1 cc. of 6N sulfuric acid and 0.2 g. of $FeSO_4 \cdot 7H_2O$ were added to 60 cc. of distilled water. Polymerization began almost immediately as evidenced by the formation of a fine, white precipitate. The reaction mixture was heated for 5 hours at 60° C., and the product which had separated was filtered off, washed free of acid and iron with distilled water and then dried. An almost quantitative yield of fine, white polymer was obtained. It was useful in the preparation of white, lustrous fibers, when dissolved in a suitable solvent, e. g. N,N-dimethylformamide, to give a 10 to 20 per cent, by weight, solution of the polymer, and the solution is spun into a coagulating bath and the fiber then drafted from 200 to 500 per cent in hot air or oil.

Similarly a polymer useful in the preparation of fibers can be obtained by substituting a molecularly equivalent amount of α-methylacrylonitrile for the acrylonitrile in the above example.

*Example 7.—Copolymer of methyl α-methylacrylate and diethyl allylphosphonate*

4 g. of methyl α-methylacrylate, 1.0 g. diethyl allylphosphonate, 0.055 g. of ammonium persulfate, 1.0 g. of sodium bisulfite and 0.5 g. of ammonium stearate were placed in 20 cc. of distilled water. The dispersion was then heated for 3 days at 50° C. The polymer which had separated was filtered off, washed with distilled water and then dried. The resulting fine, white product was useful for shaping into molded objects.

When a molecularly equivalent amount of ethyl acrylate, n-butyl α-methacrylate, acrylic acid, α-methacrylic acid, vinyl acetate, styrene, dichlorostyrene or p-acetaminostyrene replaces the methyl α-methylacrylate in the above example, other useful polymers can be obtained.

*Example 8.—Copolymer of methyl vinyl ketone and diethyl α-methylallylphosphonate*

5 g. of diethyl α-methylallylphosphonate, 10 g. of methyl vinyl ketone, 0.5 g. of polyvinyl alcohol and 0.2 g. of ammonium persulfate were dispersed in 50 cc. of water. The dispersion was heated for 20 hours at 60° C. to 70° C. and acetic acid was added. The solid which separated was filtered off, washed with distilled water and then dried.

When a molecularly equivalent amount of methyl isopropenyl ketone or phenyl vinyl ketone replaces the methyl vinyl ketone in the above example, other useful polymers can be obtained.

*Example 9.—Copolymer of vinyl chloride and diethyl allylphosphonate*

5 g. of diethyl allylphosphonate, 2 g. of soap, 0.1 g. ammonium persulfate and 0.2 g. of ammonium bisulfite were dispersed in 100 cc. of distilled water in a pressure bottle. The bottle was closed and 10 g. of vinyl chloride were passed into the bottle. After heating the bottle for 24 hours at 60° C., acetic acid was added, and the solid which separated was filtered off, washed with distilled water and then dried. The resulting white polymer was useful in the preparation of molded objects.

When a molecularly equivalent amount of vinylidene chloride replaces the vinyl chloride in the above example, a polymer which is useful in coating metal, fabrics, leather, etc. can be obtained.

*Example 10.—Copolymer of butadiene and dimethyl allylphosphonate*

5 g. of dimethyl allylphosphonate, 0.5 g. of a 10 per cent solution of hydrogen peroxide, 0.1 g. of diisopropyl dixanthogen and 0.02 g. of $FeSO_4 \cdot 7H_2O$ were dispersed in 40 g. of a 1.5 per cent aqueous solution of sodium oleate in a pressure bottle. 10 g. of 1,3-butadiene were passed into the bottle and the bottle was closed. After standing at room temperature for 24 hours, the polymerization was complete. The resulting polymer was obtained in the form of a latex-like dispersion which resembled natural rubber latex.

*Example 11.—Interpolymer of styrene, N-phenyl vinylsulfonamide and diethyl allylphosphonate*

10 g. of styrene, 2 g. of N-phenyl vinylsulfonamide and 3 g. of diethyl allylphosphonate were placed in glass bottle and 1 g. of acetyl peroxide was added. The mixture was then heated at 60° C. until it had set to a clear, light yellow, hard mass. The resulting polymer was useful in the preparation of molded objects.

*Example 12.—Copolymer of ethylene and di-n-butyl allylphosphonate*

10 g. of di-n-butyl allylphosphonate, 0.2 g. of benzoyl peroxide and 40 g. of n-hexane were placed in a silver-lined, steel autoclave. Ethylene was then pumped in until the pressure rose to 600 atmospheres. The contents of the autoclave were agitated and heated at 125° C. for 10 hours. The cooled reaction mixture was removed, and the solid residue was subjected to steam distillation and filtered. The resulting polymer was useful for shaping into molded objects, etc.

When a molecularly equivalent amount of the ester represented by the following formula:

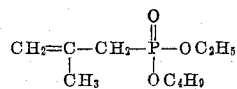

replaces the di-n-butyl allylphosphonate in the above example, a polymer useful for coating metal objects, fabrics, etc. can be obtained.

Operating in a manner similar to that illustrated in the above examples, other copolymerizable vinyl-type compounds can be interpolymerized with our new alkyl esters of allylphosphonic acids. Typical vinyl-type compounds include vinyl acetate, vinyl propionate, vinyl chloride, vinylidene chloride, acrylic acid, α-methylacrylic acid, methyl acrylate, methyl α-methylacrylate, ethyl acrylate, ethyl α-methylacrylate, n-propyl acrylate, n-propyl α-methylacrylate, isopropylacrylate, isopropyl α-methylacrylate, n-butylacrylate, n-butyl α-methylacrylate, isobutylacrylate, isobutyl α-methacrylate, styrene, ethylene, propylene, isobutylene, acrylonitrile, α-methylacrylonitrile, acrylamide, α-methylacrylamide, etc. The amount of our new dialkyl esters of allylphosphonic acids present in the polymerization mixture prior to polymerization generally can vary from about 5 to 100 per cent by weight, based on the total weight of the unsaturated polymerizable compounds present. Smaller amounts can be used, although there is ordinarily no advantage in doing so. We have found that mixtures containing from about 10 to 50 per cent by weight of our new dialkyl allylphosphonates provide especially useful polymers.

The new polymers of this invention are especially useful in the preparation of products which must be resistant to flames. Some of the polymers of our invention have been found to be non-inflammable, a property which is noticeably lacking in most synthetic polymers. Many of the polymers of this invention can be extruded into fibers when dissolved in a suitable solvent, e. g. N,N-dimethylformamide or N,N-dimethylacetamide. They can also be cast into sheets or films, or shaped into molded objects. Many are also useful in coating metals, fabrics, leather, etc.

What we claim as our invention and desire secured by Letters Patent of the United States is:

1. A resinous copolymer containing in the polymer molecule from 10 to 50 percent by weight of an allyl compound represented by the formula:

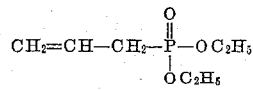

and from 90 to 50 percent by weight of acrylonitrile.

2. A resinous copolymer containing in the polymer molecule from 10 to 50 percent by weight of an allyl compound selected from those represented by the following general formula:

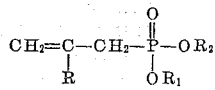

wherein R represents a member selected from the group consisting of a hydrogen atom, a methyl group and an ethyl group, and $R_1$ and $R_2$ each represents an alkyl group of the formula $C_nH_{2n+1}$ wherein n represents a positive integer of from 1 to 4, and from 90 to 50 percent by weight of acrylonitrile.

HARRY W. COOVER.
JOSEPH B. DICKEY.

References Cited in the file of this patent

UNITED STATES PATENTS

| Number | Name | Date |
| --- | --- | --- |
| 2,365,466 | Hamilton | Dec. 19, 1944 |
| 2,389,576 | Kosolapoff | Nov. 20, 1945 |
| 2,439,214 | Lindsey | Apr. 6, 1948 |
| 2,460,043 | Testers | Jan. 25, 1949 |

OTHER REFERENCES

Ludvik et al., J. Econ. Entomol., vol. 40, pages 97–100 (1947).